March 20, 1934.   R. S. NEWTON   1,951,488
GROOVING FIXTURE
Filed March 2, 1933    2 Sheets-Sheet 1

Inventor
Robert S. Newton
By
Dodge and Sons
Attorneys

March 20, 1934.  R. S. NEWTON  1,951,488
GROOVING FIXTURE
Filed March 2, 1933    2 Sheets-Sheet 2
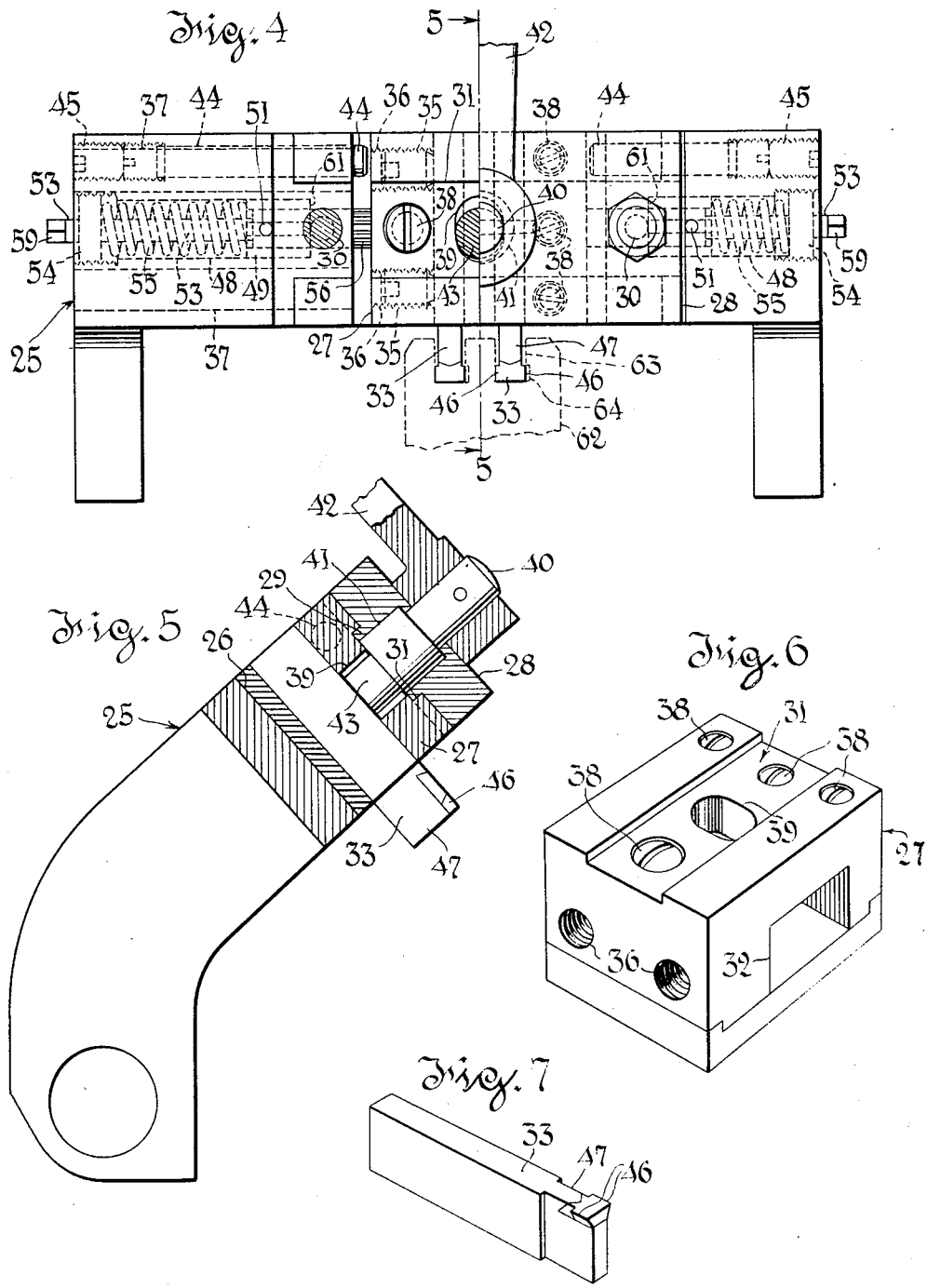
Inventor
Robert S. Newton
By
Attorneys Patented Mar. 20, 1934

1,951,488

UNITED STATES PATENT OFFICE 1,951,488

GROOVING FIXTURE

Robert S. Newton, Watertown, N. Y., assignor to The New York Air Brake Company, a corporation of New Jersey Application March 2, 1933, Serial No. 659,398

13 Claims. (Cl. 82—34)

This invention relates to the formation of ring grooves in pistons and the like, and provides an improved apparatus or fixture for use in performing such operations. It is contemplated that the fixtures hereinafter discussed may be used either on lathes or on special machines presenting analogies to lathes.

In order that piston ring grooves may remain true under progressive wear, and in order to ensure free movement with precise fit of the rings in the grooves, it is desirable to "undercut" the groove, i. e., form at the bottom of the groove an undercut or relief channel in each of the two plane faces of the groove.

Prior procedure has been to feed the grooving tool inward to cut the groove, withdraw the grooving tool, introduce the relieving tool, then traverse the relieving tool to cause it to cut the relief channels, and then withdraw the relieving tool. In this operation the relieving tool is likely to raise a burr, and if this burr is to be removed, an additional operation is ordinarily necessary.

The present invention contemplates a different sequence of operations and provides fixtures permitting such sequence of operations to be successfully carried out.

According to the present invention, the grooving tools are mounted in a primary carrier, which is bodily moved toward and from the work, as usual. On this carrier is movably mounted a secondary carrier, the secondary carrier being movable relatively to the primary carrier to bring the undercutting tools into and out of operative relation to the work.

The secondary carrier is provided with means for traversing the undercutting tools in the direction of the axis of the lathe centers and also provided with means for centering this carrier so that the undercutting tools are normally positioned precisely to enter the grooves cut by the grooving tools on the primary carrier. In other words, the tools normally are aligned with each other.

The operation is first to advance the primary carrier toward the work, cutting the groove. On the completion of this operation the grooving tool is not withdrawn, and the secondary carrier is moved to operative position. When this has been done the undercutting tool is traversed in both directions, forming the undercut while the grooving tool is in position, so that if the undercutting tool raises a burr it will be removed immediately by the grooving tool.

With the undercutting tool properly centered the secondary carrier is then retracted to withdraw the under cutting tool, and the primary carrier is finally retracted to withdraw the grooving tool, leaving the undercut groove in finished condition.

Referring to the drawings,—

Fig. 4 is a face view of the top of the secondary carrier unit. In this view the left-hand portion of the cover plate is broken away to expose the traversing carriage in which the undercutting tools are mounted.

Fig. 5 is a section on the line 5—5 of Fig. 4.

Fig. 6 is a perspective view of the traversing carriage in which the undercutting tools are mounted.

Fig. 7 is a perspective view of one of the undercutting tools.

It will be readily understood that any desired number of ring grooves might be simultaneously cut in a piston by the use of a corresponding number of grooving tools and undercutting tools. For purposes of description the simultaneous formation of two grooves will be explained.

Figure 1:
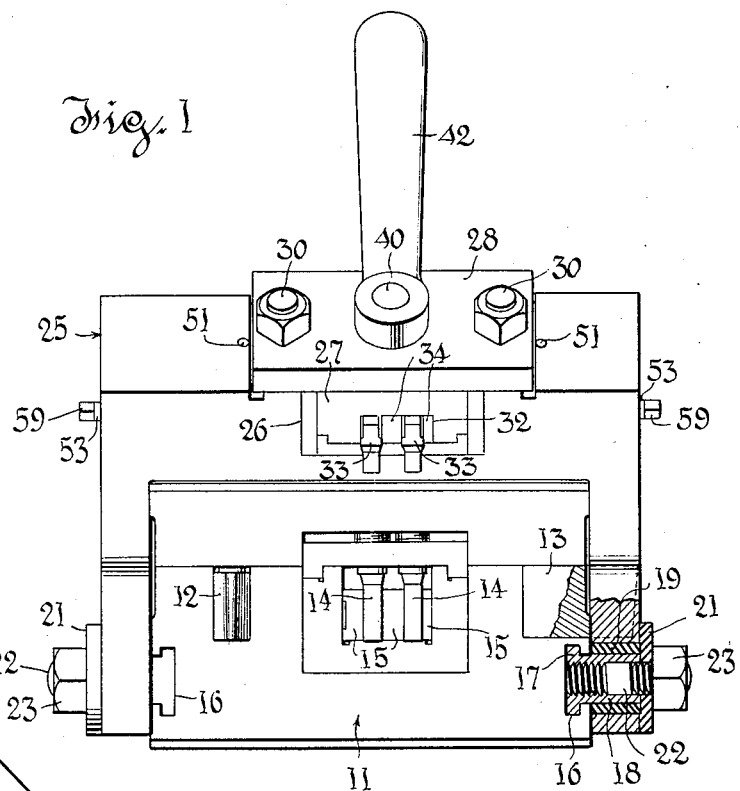
Fig. 1 is a vertical elevation of the primary and secondary tool carriers, looking toward that side which is presented to the work piece. The secondary carrier is shown in operative position.

In the drawings 11 represents an ordinary tool carrier which might be mounted on any suitable support, for example, the usual main and cross carriage structure of an engine lathe. This tool carrier may be provided with means for carrying a plurality of tools for performing different operations, but for present purposes we are concerned primarily with ring grooving tools.

For purposes of illustration a round-nose tool, used in turning the outer face of the piston, is indicated at 12, and a special forming tool is indicated at 13. The grooving tools are shown at 14, 14, and are clamped in place by any known means, the desired spacing of the grooving tools being insured by the use of shims 15.

Formed in opposite sides of the main carrier 11 are two T-slots 16 which are parallel with each other, and which guide elongated sliding members 17 having outwardly projecting hollow trunnions 18. Encircling each trunnion is a tubular bushing 19 against the end of which bears a washer 21. A stud 22 threaded into the trunnion carries a clamping nut 23. The parts are so arranged that when the nut 23 is set up it clamps the washer 21 against the end of bushing 19, and since the bushing bears against the sides of the tool carrier 11, the effect is to clamp the sliding member 17 in position.

The two bushings 19 serve as journals or fulcra for the arms of a U-shaped yoke 25. This yoke is the main element of the secondary carrier and may be swung around its fulcrum to bring the grooving tools into and out of operative relation with the work piece.

The adjustability of the sliding members 16 permits a variation of the angle of the undercutting tool with reference to the work piece, such an adjustment being desirable where work pieces of different diameters are to be operated upon.

In the cross-piece of yoke 25 is formed a notch or recess 26 in which a tool clamping carriage 27 is slidable. This carriage forms a portion of the secondary tool carrier. The carriage 27 is so guided that it moves in a path parallel with the rotary axis of the work piece held in the lathe. The carriage 27 is confined by a cap plate 28 which is formed on its lower face with a rib 29 entering the longitudinal groove 31 which is formed in the top of the carriage 27. The cap plate 28 is held in place by studs 30, with nuts as shown.

The carriage 27 is provided with a transverse opening 32 in which the undercutting tools 33 are mounted. The undercutting tools are so dimensioned that they will freely enter grooves cut by the grooving tools 14. They are spaced by means of shims 34 to correspond with the spacing of the grooving tools 14. The tools are clamped in position in the carriage 27 by two socketed set screws 35, indicated in dotted lines on Fig. 4. These set screws are threaded into the holes 36 clearly shown in Fig. 6, and access to them may be had through aligned holes 37 formed in the yoke 25 for that purpose. Consequently it is not necessary to remove the carriage 27 from the yoke 25 in order to insert the tools 33.

The carriage 27 is preferably made in two pieces, as clearly shown in the drawings, and these two pieces are held together at one end by three screws and at the other end by a single screw, all such screws being indicated by the numeral 38, but this detail is not important.

Formed in the upper face of the carriage 27 within the groove 31, is an elongated slot 39 extending transversely to the carriage. An actuating stem 40 is swiveled at 41 in the cap plate 28 and carries an eccentric extension 43 which works in the slot 39, so that rotation of the stem 40 in opposite directions will cause the reciprocation of the carriage 27. To rotate the stem 40 a handle 42 is pinned thereto, and serves as a convenient means both to swing the yoke on the trunnions 19 and to traverse the carriage 27.

The sliding motion of the carriage 27 is limited in each direction by a corresponding adjustable stop screw 44. There are two of these screws and each is locked in adjusted position by a socketed set screw 45.

The form of the undercutting tool 33 is clearly indicated in Fig. 7. It shows the tool as provided with two oppositely extending lateral lips 46 which are the cutting elements of the tools. The stops 43 are so set as to permit the lips 46 to form the necessary undercut but yet prevent the reduced shank 47 of the undercutting tool from striking the side of the groove.

The device so far described can be operated if care is exercised to center the carriage 27, but I prefer to provide means for automatically centering this carriage. This means comprises two yielding members which urge the carriage to its centered position and there cease to act. To permit moderate adjustment of this centered position means are provided to adjust the point at which the spring stops cease to act.

The two mechanisms are identical and are mounted in two aligned bores 48. In each bore there is slidably mounted a sleeve 49 which is kept from rotating in the bore by means of a pin 51 fixed in yoke 25 and working in a longitudinal slot in sleeve 49. Each sleeve is internally threaded to receive the threaded portion 52 of a stem 53 which extends outward through a bushing 54. The bushing 54 is threaded into the outer end of a corresponding hole 48. A coiled compression spring 55 reacts between the bushing 54 and the sleeve 49 to urge the sleeve 49 inward. The stem 53 projects beyond the sleeve 49 and serves as a stop for the carriage 27.

Beyond the sleeve 49 the stem 53 is longitudinally fluted, as indicated at 56, and is held impositively against rotation by a ball detent 57 urged by a coiled compression spring 58. Each of the stems 53 may be turned by means of a squared nut 59 upon which a wrench or key, not shown, may be mounted.

The inward motion of the sleeve 49 is limited by a shoulder 61 and the distance that the stem 53 projects inward beyond the sleeve 49 is determined by turning the stem 53. The ball detent preserves whatever adjustment is made. The parts are so adjusted that the two sleeves 49 are against the shoulders 61 and the ends of the two stems 53 both contact the carriage 27 and hold it in the desired centered position. By swinging the handle 42 in opposite directions, the carriage may be traversed against the resistance of the springs 55 selectively. The amount of such motion is positively limited by the stop screws 44. The springs 55 are stressed heavily enough to insure the return of the carriage 27 to its centered position when the handle 42 is released.

Figure 2:
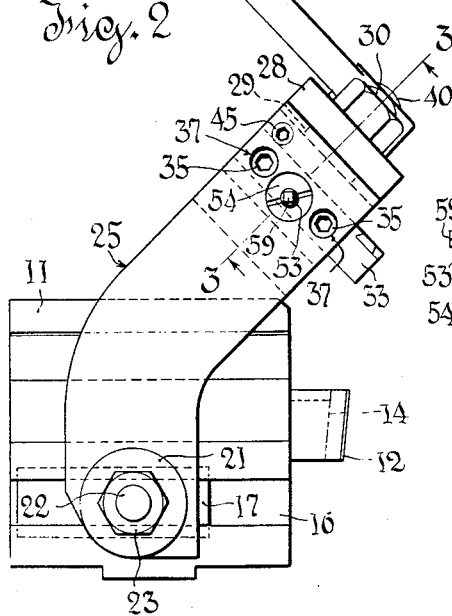
Fig. 2 is an end elevation looking to the right relatively to Fig. 1.
Figure 3:
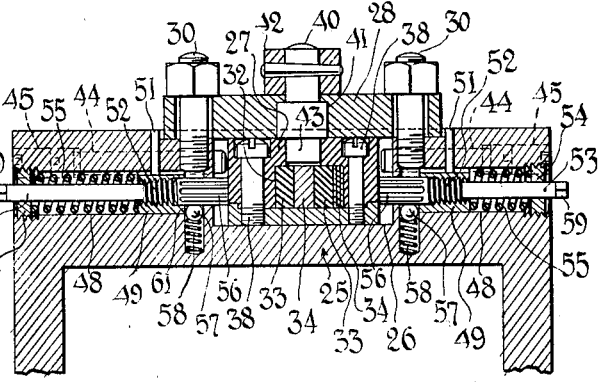
Fig. 3 is a fragmentary section on the line 3—3 of Fig. 2.

The operation of grooving a piston may now be described, the outline of the piston being indicated in dotted lines in Fig. 4 at 62. The side walls of the groove are indicated at 63 and the undercut at 64. In Fig. 4 the piston is shown with the carriage 27 in centered position after the righthand undercuts have been formed and before the lefthand undercuts have been formed. Disregarding the functions of the tools 12 and 13, which are not concerned with the grooving operation, let it be assumed that a piston has been turned and is in position for grooving. With the piston rotating, as usual, on the axis of the lathe, the primary carrier 11 is traversed toward the work piece so that the grooving tools 14 cut and form the grooves. After the grooves have been cut the carrier is not immediately retracted. The operator swings the yoke 25 toward the work, the position being approximately that shown in Figs. 1 and 2. Since the carriage 27 is held centered, the undercutting tools 33 enter freely the grooves formed by the grooving tools 14, and are brought by the motion of the yoke 25 to the bottoms of these grooves. When in this position, the handle 42 is swung first to one side and then to the other side, causing the lips 46 of the tools 33 to cut the desired relief channels.

If the lips 46 tend to produce a burr, this burr will immediately be removed by the grooving tools 14.

On the completion of the undercutting operation, and with the handle 42 in its central position so that the tools 33 are centered, the yoke 25 is swung away from the work and the primary carrier 11 is retracted to withdraw the grooving tools 14.

While the details of construction above set forth are preferred, the fact that modifications are possible is recognized, and the description is to be interpreted as illustrative rather than limiting. For example, while I prefer to hinge the secondary carrier to the primary carrier, the essential thing is that it be movable relatively to the primary carrier in such a way as to bring it into and out of operative position.

A change in the mode of guiding the secondary carrier would obviously entail the use of an adjusting means specifically different from the adjustable trunnions 18 in order to insure proper angular adjustment of the undercutting tools.

The eccentric 43 for traversing the carriage 27 is only one of various mechanisms that might be used for this purpose. The stops and tool clamps are similarly subject to variation within the skill of a mechanic. The yielding centering mechanism may be modified without departing from the invention.

What is claimed is,—

1. The combination of a primary tool carrier; a grooving tool carried thereby; an undercutting tool; secondary carrying means for said undercutting tool having two independent motions relatively to the first carrier, the first toward and from the work piece, and the second a traversing motion transverse to a groove cut by the grooving tool; means for selectively so moving said secondary means; and means normally centering said secondary means with respect to said traversing motion to align said tools.

2. The combination of a primary tool carrier; a grooving tool carried thereby; an undercutting tool; secondary carrying means for said undercutting tool having two independent motions relatively to the first carrier, the first toward and from the work piece, and the second a traversing motion transverse to a groove cut by the grooving tool; means for selectively so moving said secondary means; opposed yielding means acting on said secondary means in the directions of such traversing motion; and means for arresting both said yielding means to limit the range of action thereof upon said secondary means.

3. The combination of a primary tool carrier; a grooving tool carried thereby; an undercutting tool; secondary carrying means for said undercutting tool having two independent motions relatively to the first carrier, the first toward and from the work piece, and the second a traversing motion transverse to a groove cut by the grooving tool; means for selectively so moving said secondary means in the directions of such traversing motion; means for arresting both said yielding means to limit the range of action thereof upon said secondary means; and means for adjusting the last-named means.

4. The combination of a primary tool carrier; a grooving tool carried thereby; an undercutting tool; secondary carrying means for said undercutting tool having two independent motions relatively to the first carrier, the first toward and from the work piece, and the second a traversing motion transverse to a groove cut by the grooving tool; means for selectively so moving said secondary means; and opposed yielding means resisting traversing motion of said secondary means from a normal position defined thereby, and comprising, a member constrained to motion in an axial direction, a spring reacting thereagainst, means for limiting the motion of said member under the urge of said spring, a stem threaded in said member and adapted to react upon said secondary means, and an impositive detent resisting rotation of said stem.

5. The combination of a primary tool carrier for a lathe or the like; a grooving tool mounted on said carrier, and brought thereby into and out of cutting relation with a work piece; a secondary carrier movably mounted on said primary carrier and shiftable thereon between operative and inoperative positions; a tool carriage mounted on said secondary carrier and movable thereon in a path parallel with the lathe axis; a relieving tool carried by said carriage and capable of entering a groove cut by the first named tool; means defining a neutral position of said carriage in which the relieving tool will enter such groove, as the secondary carrier is moved to operative position; and means for traversing the carriage from such neutral position.

6. The combination of a primary tool carrier for a lathe or the like; a grooving tool mounted on said carrier, and brought thereby into and out of cutting relation with a work piece; a secondary carrier movably mounted on said primary carrier and shiftable thereon between operative and inoperative positions; a tool carriage mounted on said secondary carrier and movable thereon in a path parallel with the lathe axis; a relieving tool carried by said carriage and capable of entering a groove cut by the first named tool; means defining a neutral position of said carriage in which the relieving tool will enter such groove, as the secondary carrier is moved to operative position; means for traversing the carriage from such neutral position; and adjustable means for limiting such motion.

7. The combination of claim 5, further characterized in that the secondary carrier is pivoted to the primary carrier.

8. The combination of claim 5, further characterized in that the secondary carrier is pivoted to the primary carrier on an axis adjustable toward and from the lathe axis.

9. The combination of claim 5, further characterized in that the means defining a neutral position comprise a yielding member reacting against the tool carriage.

10. The combination of claim 5, further characterized in that the means defining a neutral position comprise a yielding member reacting against the tool carrier, and the traversing means comprises a manually actuated member for forcing said tool carriage against the resistance offered by said yielding member.

11. The combination of claim 5, further characterized in that the means defining a neutral position comprise opposed yielding members reacting against the tool carriage and means for limiting the action of said yielding members when the carriage is in said neutral position.

12. The combination of claim 5, further characterized in that the means defining a neutral position comprises opposed yielding members reacting against the tool carriage and means for limiting the action of said yielding members when the carriage is in said neutral positon; and the traversing means comprise a manually actuated member for forcing said tool carriage selectively against the resistance offered by respective yielding members.

13. The combination of claim 5, further characterized in that the means defining a neutral position comprise opposed yielding members reacting against the tool carriage, means for limiting the range of action of said yielding means, and means for adjusting the last-named means.

ROBERT S. NEWTON.